No. 842,630. PATENTED JAN. 29, 1907.
W. COOPER.
AUTOMATIC CLUTCH.
APPLICATION FILED JULY 14, 1906.
2 SHEETS—SHEET 1.
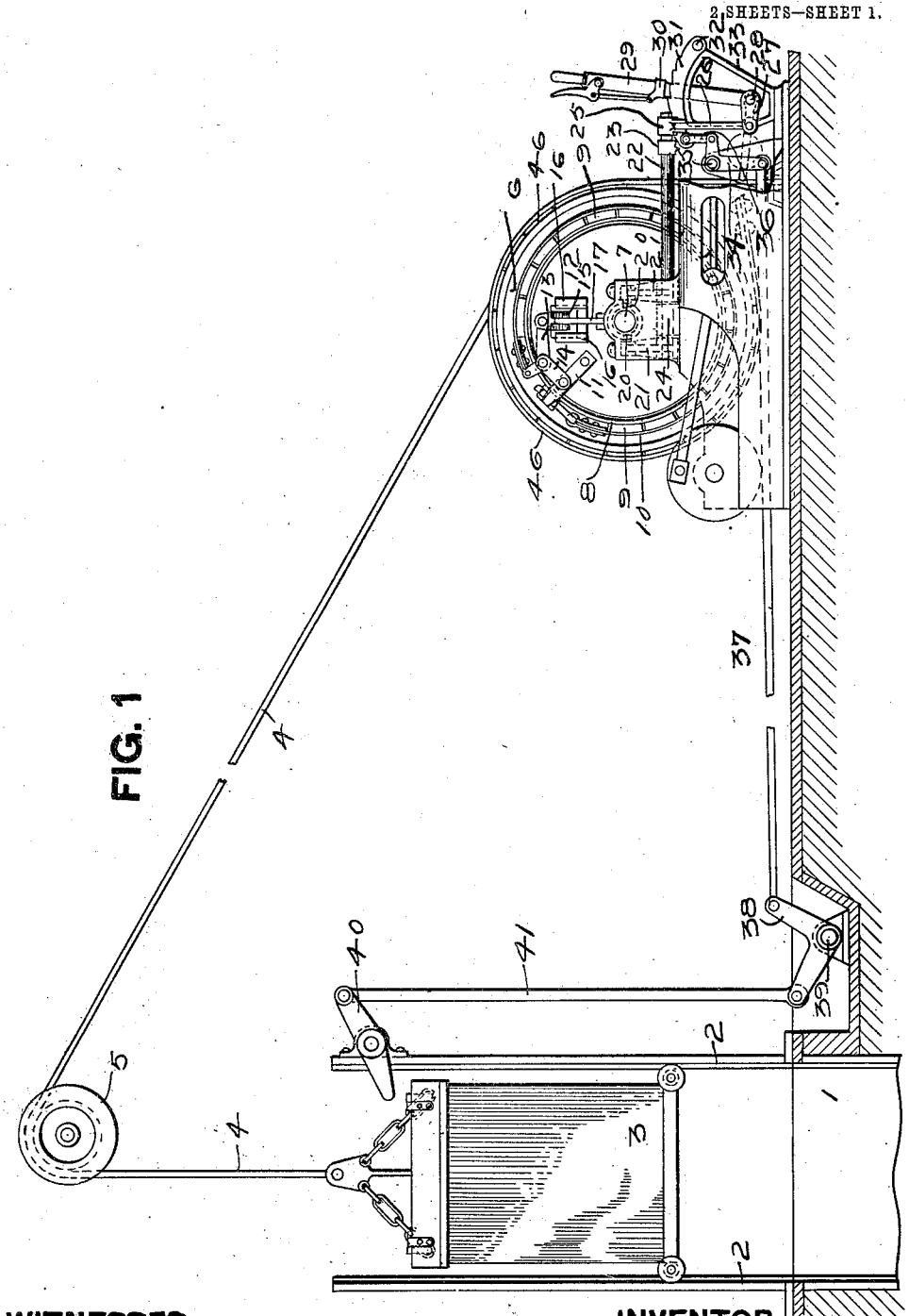
FIG. 1
WITNESSES.
INVENTOR.
William Cooper, by
Edward A. Lawrence,
his attorney.

No. 842,630. PATENTED JAN. 29, 1907.
W. COOPER.
AUTOMATIC CLUTCH.
APPLICATION FILED JULY 14, 1906.

2 SHEETS—SHEET 2.

WITNESSES.
M. A. Adler.
J. H. Harrison.

INVENTOR
William Cooper
by Edward A. Lawrence,
his Attorney.

UNITED STATES PATENT OFFICE.

WILLIAM COOPER, OF DENVER, COLORADO.

AUTOMATIC CLUTCH.

No. 842,630.  Specification of Letters Patent.  Patented Jan. 29, 1907.

Application filed July 14, 1906. Serial No. 326,167.

*To all whom it may concern:*

Be it known that I, WILLIAM COOPER, a citizen of the United States, and residing in the city of Denver, in the county of Denver and State of Colorado, have invented or discovered new and useful Improvements in Automatic Clutches, of which the following is a specification.

My invention consists of new and improved safety devices for use in connection with hoisting mechanism of all kinds, such as mine or other elevating or draft machinery. A frequent accident in the use of such machinery and one fraught with great danger to both lives and property is due to the loss of control over the hoists, resulting in an "overwind" and dashing the cage, bucket, skip, or other hoisting receptacle against the sheave or gallows frame. In such cases the machinery refuses to respond to the usual controlling mechanism, and I therefore provide automatic means to release the rotating or winding power from the cable-drum or other elevating means and render the same idle, so that it may be readily stopped in an instant with the hand or other braking means assisted by the load. I have shown mechanism which engages the runaway cage or other hoisting-receptacle at a predetermined point and is actuated thereby, in turn automatically releasing the friction or other clutch or connecting mechanism between the power mechanism and the cable-spool or corresponding device.

Figure 2:
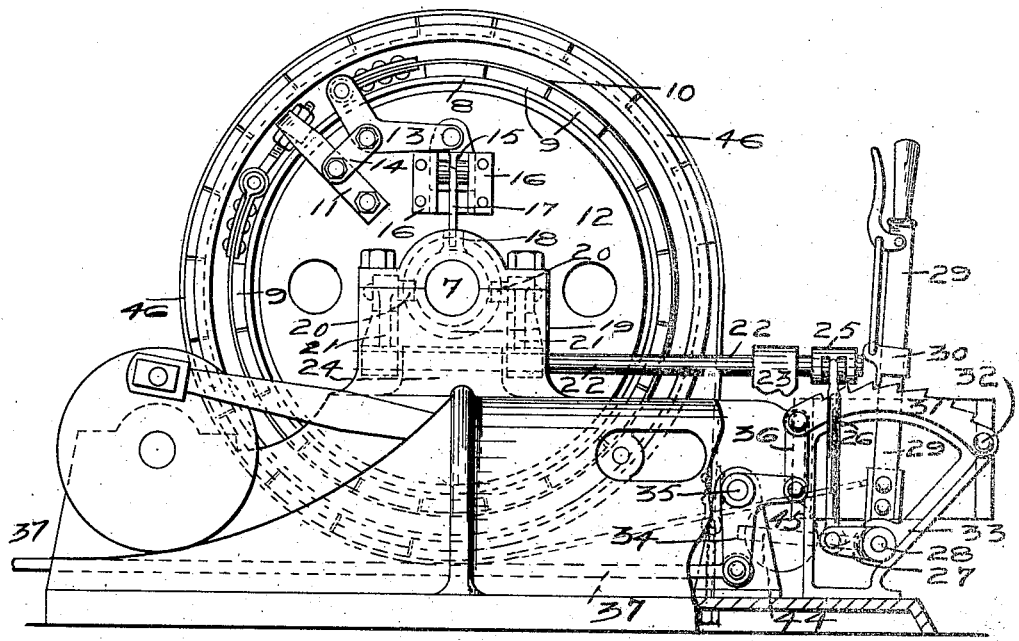
Figure 3:
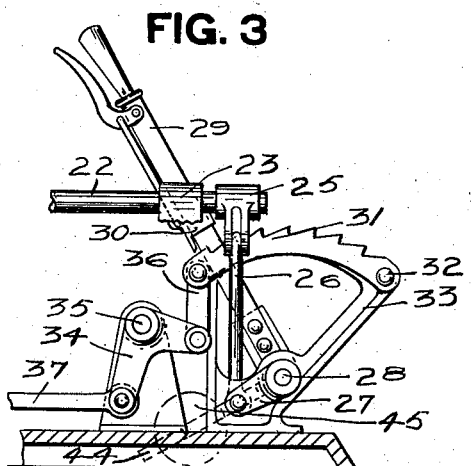
Figure 4:
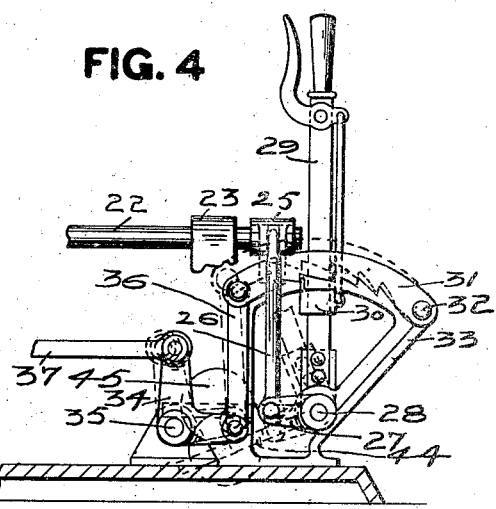

In the accompanying drawings, Figure 1 is a general side view of a mine-shaft and hoisting mechanism of a well-known type, showing my invention applied, the cylinders and brake-controlling mechanism being omitted for the sake of clearness, the clutch being shown "on." Fig. 2 is an enlarged detail of the hoisting-engine shown in Fig. 1 with the cylinders and brake omitted and the clutch on. Fig. 3 is a detail of the clutch-releasing mechanism enlarged and the clutch being "off;" and Fig. 4 is a similar view to Fig. 3 of one of the many modifications of which my invention is capable, the clutch-locking device being shown on in solid lines and off in dotted lines.

The following is a detailed description of the drawings, which are, however, intended merely to illustrate the principles of my invention and not to limit the scope thereof to the construction shown.

1 is the mouth of a mine-shaft, shown in this case as a vertical shaft; but it will be understood that my invention may be equally well applied to mines or hoists where the shaft or well is inclined, as in a slope mine, or horizontal, as in a drift mine.

2 2 are the guides or rails to steady the cage or other receptacle, which guides are shown extended beyond the mouth of the shaft for purposes to be described.

3 is the cage or other hoisting-receptacle, the type of receptacle varying with the character of the mine-shaft or hoists.

4 is the cable by means of which the cage is suspended or controlled, which cable passes over the sheave 5, mounted in the gallows-frame (not shown) and wound about the cable drum or spool 6 of the hoisting-engine. Said spool is mounted loosely in the usual manner on the power-shaft 7 of the engine, to which it may be operatively coupled by means of the friction-clutch, to be described.

8 is an annular lip or flange on the side of spool 6, against which the friction-blocks 9 9 are caused to bear when the clutch is thrown on. 10 is the clutch-band on which said blocks are mounted. One end of said band 10 is secured to member 11, which is rigidly attached to disk 12, which rotates with shaft 7. The other end of said band is pivotally attached to the outer arm of bell-crank lever 13, which is pivoted at its angle by means of link or links 14 to member 11. To the inner arm of lever 13 is loosely pivoted the slide 15, which is adapted to be reciprocated in guides 16 16, attached to disk 12.

17 is a connecting-rod pivoted at one end to slide 15 and at the other end to thimble 18, which is slidably mounted on shaft 7 and rotates therewith.

19 is an annular groove in thimble 18, in which are seated antifriction-rollers 20 20, which are mounted on the free ends of standards 21 21, which are rigidly mounted on rock-shaft 22. Rock-shaft 22 is preferably suitably mounted or journaled in the engine bed-frame, as at 23 and 24.

25 is a bifurcated arm rigidly attached to rock-shaft 22, to the outer end of which is pivoted connecting-rod 26, whose lower end is pivoted to the arm 27, rigidly attached to rock-shaft 28, suitably journaled in the engine bed-frame.

29 is a hand-lever rigidly attached at its lower end to rock-shaft 28 and provided with locking-latch mechanism 30.

31 is a locking-quadrant which is pivoted at one end, as at 32, to the stationary frame 33, the other end of said quadrant being free to swing, so that its teeth may be dropped out of engagement with latch 30.

34 is a bell-crank lever pivoted at 35 to the engine-frame and having its upper arm pivotally connected to the free end of quadrant 31 by means of connecting-rod 36. The lower arm of said bell-crank lever 34 is pivoted to connecting-rod 37, running forward under the engine and pivotally connected at its forward end to one arm of the bell-crank lever 38, which is itself pivoted at a fixed point, as 39, adjacent to the shaft-mouth.

40 is a lever or "kicker" pivoted to one of the guides 2 or the gallows-frame and adapted to be engaged and knocked aside by the ascending cage. The location of said kicker above the mouth of the shaft is at a sufficient elevation that it is not engaged by the cage in the ordinary operation of loading and unloading, but is only struck by said cage when a runaway occurs and an overwind is threatened.

41 is a connecting-rod having its upper end pivoted to the outer end of kicker 40 and its lower end pivoted to an arm of bell-crank lever 38.

It is evident that when the kicker 40 is struck and operated by the ascending cage the outer end of said kicker will be depressed, likewise depressing the left arm of bell-crank lever 38, as the same is shown, drawing forward connecting-rod 37, likewise depressing the free end of quadrant 31, thus dropping its teeth out of engagement with spring-latch 30 of hand-lever 29, thus releasing said lever.

44 is an arm rigidly attached to shaft 28 and provided with a counterbalance-weight 45, which serves to throw lever 29 toward the left, as shown, thus when the quadrant is dropped, as above described, rotating shaft 28 toward the engine, which action rocks shaft 22 away from disk 12, drawing outwardly the standards 21 21 and with them the thimble 18 along the shaft 7. This motion of said thimble will draw inwardly slide 15 and with it the inner arm of bell-crank lever 13, thus releasing the friction-blocks 9 from close engagement with flange 8 on the cable-drum 6, and thus releasing said drum from the rotating power and rendering it idle. It is thus evident that the ascension of the cage to a predetermined point automatically throws off the clutch from the cable-drum and allows the same to become idle, so that it may be readily brought to a prompt stop by the use of the hand-brake or other suitable mechanism.

In Fig. 4 I show one of the numerous variations of which this embodiment of my invention is capable. In this case the quadrant is arranged with teeth on its under side, and when the clutch is to be thrown off the automatic mechanism operated by the runaway cage acts to raise the quadrant out of engagement with the spring-latch 30, which is also in the reverse position shown. Otherwise the operation is substantially the same as above described.

It is evident from the above that my safety device is entirely automatic in its action, which is positive and instantaneously releases the cable-drum or corresponding mechanism from its operative connection with the power mechanism. I have shown my invention installed in connection with a well-known type of steam hoisting-engine; but its applicability to any other type or to gas or explosive engines, electric motors, or any other character of power mechanism is self-evident. Whatever may be the character of operative connection between the power mechanism and the elevating machinery my invention may be readily arranged to automatically sever such connection in case of a runaway or other accident or in general use, if desired.

Many variations and modifications will suggest themselves to one skilled in the art, which, however, I regard as rightfully within the scope of my invention and therefore claim broadly—

1. In hoists, a hoisting-receptacle, a cable-drum, a power-shaft, a clutch interposed between said drum and said shaft, a lever controlling said clutch and provided with a spring-latch, a swinging quadrant adapted to be engaged by said latch, a bell-crank lever pivotally connected to said quadrant and means whereby the said receptacle in passing a given point rocks said bell-crank lever.

2. In hoists, a hoisting-receptacle, a cable-drum, a power-shaft, a clutch interposed between said drum and said shaft, a lockable lever controlling said clutch, a locking-quadrant, pivoted to swing and adapted to engage said lever, a bell-crank lever pivotally connected to said quadrant and means whereby the said receptacle in passing a given point rocks said bell-crank lever.

3. In hoists, a hoisting-receptacle, a cable-drum, a power-shaft, a clutch interposed between said drum and said shaft, a lever controlling said clutch, a locking-quadrant adapted to engage said lever, said quadrant being pivoted to swing, a bell-crank lever pivotally connected with said quadrant, a kicker adapted to be engaged by said receptacle and means whereby said engagement rocks said bell-crank lever.

4. In hoists, a hoisting-receptacle, a power-shaft, a cable-drum loosely mounted on said shaft, a friction-clutch interposed between said shaft and said drum, a controlling-lever connected with said clutch, a pivoted locking-quadrant adapted to lock said lever stationary, a bell-crank lever pivotally connected to said quadrant, a second bell-crank lever, a connecting-rod between said bell-crank levers, a kicker adapted to be engaged by said receptacle and operative connection between said kicker and said second bell-crank lever.

Signed at Denver, Colorado, this 7th day of July, 1906.

WILLIAM COOPER.

Witnesses:
M. H. SWEET,
J. R. HALDEMAN.